United States Patent
Boliek et al.

(10) Patent No.: US 11,095,622 B2
(45) Date of Patent: *Aug. 17, 2021

(54) CONTENT DISTRIBUTION SYSTEMS AND METHODS

(71) Applicant: MO-DV, INC., Campbell, CA (US)

(72) Inventors: Martin Boliek, San Francisco, CA (US); Robert D. Widergren, Campbell, CA (US); Wayne S. Hossenloop, Los Gatos, CA (US)

(73) Assignee: MO-DV, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,472

(22) Filed: Oct. 9, 2018

(65) Prior Publication Data
US 2019/0044921 A1    Feb. 7, 2019

Related U.S. Application Data

(63) Continuation of application No. 13/246,695, filed on Sep. 27, 2011, now Pat. No. 10,104,046.
(Continued)

(51) Int. Cl.
*H04L 29/06* (2006.01)
(52) U.S. Cl.
CPC ......... *H04L 63/0428* (2013.01); *H04L 63/08* (2013.01); *H04L 63/0869* (2013.01)
(58) Field of Classification Search
USPC .......... 726/23, 2, 21, 36; 713/150, 163, 181; 380/255, 264, 276
See application file for complete search history.

(56) References Cited

U.S. PATENT DOCUMENTS 5,506,575 A * 4/1996 Ormos ............... G07C 9/00817
                                                            235/382.5
5,633,839 A * 5/1997 Alexander ......... G06Q 20/1235
                                                                221/3
(Continued)

FOREIGN PATENT DOCUMENTS

EP          0197552         10/1986
EP          0197552 A2      10/1986
(Continued)

OTHER PUBLICATIONS

PCT International Search Report for PCT/US2012/057254, dated Jan. 29, 2013, 3 pages.
(Continued)

*Primary Examiner* — Sharif E Ullah
(74) *Attorney, Agent, or Firm* — Womble Bond Dickinson (US) LLP

(57) ABSTRACT

A content dispensing device includes memory storing one or more executable programs, each of the programs compatible with a respective operating system, each executable program for enabling performance of a data set on a respective presentation system. The memory stores a plurality of data sets, each configured for presentation by a respective presentation system. Each data set includes at least one attribute securely linking the data set to one of the executable programs. The device also includes at least one interface configured to transfer information to a protected memory device, the protected memory device configured to directly couple to the content dispensing device. The information transferred to the protected memory device includes at least one portion of a data set of the plurality of data sets, and an executable program of the one or more executable programs that is compatible with the operating system of the presentation system.

20 Claims, 11 Drawing Sheets

Related U.S. Application Data

(60) Provisional application No. 61/539,453, filed on Sep. 26, 2011.

(56) References Cited

U.S. PATENT DOCUMENTS

| | | | | |
|---|---|---|---|---|
| 5,734,823 | A * | 3/1998 | Saigh | G06F 15/0283 |
| | | | | 709/217 |
| 5,734,891 | A * | 3/1998 | Saigh | G11B 27/102 |
| 5,796,825 | A * | 8/1998 | McDonnal | G06F 21/602 |
| | | | | 713/165 |
| 5,959,945 | A * | 9/1999 | Kleiman | G07F 17/305 |
| | | | | 340/5.74 |
| 6,232,539 | B1 | 5/2001 | Looney | G10H 1/0041 |
| | | | | 434/307 A |
| 6,389,399 | B1 * | 5/2002 | Yasuda | G11B 7/28 |
| | | | | 704/270 |
| 6,466,920 | B1 * | 10/2002 | Okayama | G06F 21/10 |
| | | | | 380/201 |
| 6,496,802 | B1 * | 12/2002 | van Zoest | G06Q 30/0225 |
| | | | | 705/14.73 |
| 6,581,841 | B1 * | 6/2003 | Christoffersen | G06F 21/755 |
| | | | | 235/380 |
| 6,687,683 | B1 * | 2/2004 | Harada | G06F 21/10 |
| | | | | 380/255 |
| 6,697,306 | B2 * | 2/2004 | Sako | G06T 1/0021 |
| | | | | 369/47.12 |
| 6,959,288 | B1 * | 10/2005 | Medina | G06Q 20/3829 |
| | | | | 705/51 |
| 6,961,858 | B2 * | 11/2005 | Fransdonk | G06F 21/10 |
| | | | | 380/281 |
| 6,993,509 | B2 * | 1/2006 | Vidich | G11B 20/00086 |
| | | | | 380/200 |
| 7,039,944 | B1 * | 5/2006 | Cho | H04L 63/083 |
| | | | | 705/59 |
| 7,191,153 | B1 * | 3/2007 | Braitberg | G06Q 20/123 |
| | | | | 705/51 |
| 7,206,941 | B2 * | 4/2007 | Raley | G06F 21/10 |
| | | | | 705/51 |
| 7,415,439 | B2 * | 8/2008 | Kontio | G06F 21/10 |
| | | | | 705/53 |
| 7,630,986 | B1 * | 12/2009 | Herz | G06Q 10/10 |
| 2002/0046404 | A1 * | 4/2002 | Mizutani | H04N 21/4753 |
| | | | | 725/58 |
| 2003/0040838 | A1 * | 2/2003 | Lagunzad | G07F 17/0014 |
| | | | | 700/232 |
| 2003/0084283 | A1 * | 5/2003 | Pixton | H04H 20/26 |
| | | | | 713/163 |
| 2004/0139312 | A1 * | 7/2004 | Medvinsky | G06F 21/31 |
| | | | | 713/150 |
| 2005/0044016 | A1 * | 2/2005 | Irwin | G06Q 20/367 |
| | | | | 705/30 |
| 2006/0041733 | A1 * | 2/2006 | Hyser | G06F 12/0813 |
| | | | | 711/203 |
| 2006/0130128 | A1 * | 6/2006 | Gorancic | G06F 21/123 |
| | | | | 726/9 |
| 2006/0161635 | A1 * | 7/2006 | Lamkin | G06F 16/4387 |
| | | | | 709/217 |
| 2009/0164032 | A1 * | 6/2009 | Kedem | G06F 16/4393 |
| | | | | 700/94 |
| 2010/0205445 | A1 * | 8/2010 | Anglin | G06T 1/0021 |
| | | | | 713/176 |
| 2012/0329430 | A1 * | 12/2012 | Chatani | H04L 12/2818 |
| | | | | 455/411 |

FOREIGN PATENT DOCUMENTS

| | | |
|---|---|---|
| EP | 1081616 A2 | 3/2001 |
| JP | 11168464 A | 6/1999 |
| JP | 2000298943 | 10/2000 |
| JP | 2001136160 A | 5/2001 |
| JP | 2001175946 A | 6/2001 |
| JP | 2001202088 A | 7/2001 |
| JP | 2001236394 | 8/2001 |
| JP | 2003108790 A | 4/2003 |
| JP | 2003228771 A | 8/2003 |
| JP | 2003271766 A | 9/2003 |
| WO | 0144893 A2 | 6/2001 |
| WO | 0176128 A2 | 10/2001 |
| WO | 02097781 A1 | 12/2002 |

OTHER PUBLICATIONS

PCT Written Opinion of the International Searching Authority for PCT/US2012/057254, dated Jan. 29, 2013, 5 pages.

PCT International Preliminary Report on Patentability for PCT/US2012/057254, dated Apr. 10, 2014, 7 pages.

MO-DV, Inc., (Applicant), 04796016.6, Oct. 20, 2004, Supplemental European Search Report dated May 12, 2011, 5 pages.

MMC Entertainment Group, Inc., (Applicant), Oct. 20, 2004, International Search Report and Written Opinion dated Feb. 16, 2005, 8 pages.

MO-DV Inc., Office Action, Japanese Patent Application 2006-536802, dated Mar. 30, 2010, 4 pages.

MO-DV Inc., Office Action, Japanese Patent Application 2006-536802, dated Jan. 18, 2011, 4 pages.

MO-DV Inc., Office Action, Korean Patent Application, 10-2006-7009862, dated Apr. 27, 2011, 3 pages.

MO-DV Inc., Notice of Allowance, KR 2006-7009862, dated Jun. 28, 2012, 3 pages.

Mo-DV, Inc., ISR/WO, PCT/US2012/057254, dated Jan. 29, 2013, 8 pages.

Mo-DV Inc., Communication pursuant to Article 94(3) EPC, EP 04796016.6, dated Mar. 11, 2013, 5 pages.

Mo-DV Inc., First Examination Report, IN 2918/delnp/2006, dated Mar. 25, 2013, 2 pages.

Mo-DV Inc., Questioning, Japanese Patent Application 2006-536802, dated Dec. 13, 2011, 3 pages.

Mo-DV Inc., Notice of Preliminary Rejection, Korean Patent Application 10-2006-7009862, dated Mar. 26, 2012, 2 pages.

* cited by examiner

CONTENT DISTRIBUTION SYSTEMS AND METHODS

RELATED APPLICATIONS

The present application is a continuation of and claims the benefit of U.S. patent application Ser. No. 13/246,695, filed on Sep. 27, 2011 which claims priority to U.S. provisional application 61/539,453, filed Sep. 26, 2011, which is hereby incorporated by reference.

This application is related to U.S. application Ser. No. 12/184,483, filed Aug. 1, 2008, which is a continuation of U.S. application Ser. No. 10/970,840, filed Oct. 20, 2004, which claims priority to U.S. Provisional Patent Application No. 60/512,947, filed on Oct. 20, 2003, all of which are hereby incorporated by reference in their entireties.

BACKGROUND

Digital media, such as movies, music and games, are increasingly popular. Although several prominent systems, such as the Internet and/or cellular communications, of accessing digital files exist, these systems assume that the party wishing to receive the files has a medium to which to download the files. Moreover, mobility of consumers mandates remote entertainment access for situations where event streaming and download entertainment are not practical.

SUMMARY OF EMBODIMENTS

A content dispensing device includes memory storing one or more executable programs, each of the programs compatible with a respective operating system, each executable program for enabling performance of a data set on a respective presentation system. The memory stores a plurality of data sets, each configured for presentation by a respective presentation system. Each data set includes at least one attribute securely linking the data set to one of the executable programs. The device also includes at least one interface configured to transfer information to a protected memory device, the protected memory device configured to directly couple to the content dispensing device. The information transferred to the protected memory device includes at least one portion of a data set of the plurality of data sets, and an executable program of the one or more executable programs that is compatible with the operating system of the presentation system.

A content dispensing device includes memory storing one or more executable programs, each of the programs compatible with a respective operating system, each executable program for enabling performance of a data set on a respective presentation system. The memory stores a plurality of data sets, each configured for presentation by a respective presentation system, wherein each data set includes at least one attribute securely linking the data set to an executable program of the one or more executable programs. The device further includes at least one interface configured to transfer information to an intermediate device that is configured to store the data set and the executable program. The information transferred to the intermediate device includes at least one portion of a data set of the plurality of data sets selected by a user of the presentation system, and an executable program of the one or more executable programs that is compatible with the operating system of the presentation system.

A content dispensing device includes a first content dispensing storage device storing one or more executable programs, each of the programs compatible with a respective operating system of a multiplicity of distinct operating systems, each of the executable programs for enabling performance of a data set on a respective presentation system. The device also includes a second content dispensing storage device storing a plurality of data sets, each data set configured for presentation by a respective presentation system, wherein each data set includes at least one attribute securely linking the data set to an executable program of the one or more executable programs. A first interface of the devices is configured to transfer a first set of information to a first storage device. The first set of information transferred to the first storage device includes either (A) at least one portion of a data set of the plurality of data set selected by a user of the presentation system, or (B) an executable program of the one or more executable programs that is compatible with the operating system of the presentation system. A second interface of the device is configured to transfer a second set of information to a second storage device. The second set of information transferred to the second storage device includes (A) at least one portion of the data asset of the plurality of data sets selected by a user of the presentation system and (B) an executable program of the one or more executable programs that is compatible with the operating system of the presentation system.

BRIEF DESCRIPTION OF THE DRAWINGS

Like reference numerals refer to corresponding parts throughout the drawings.

DESCRIPTION OF EMBODIMENTS

Figure 1:
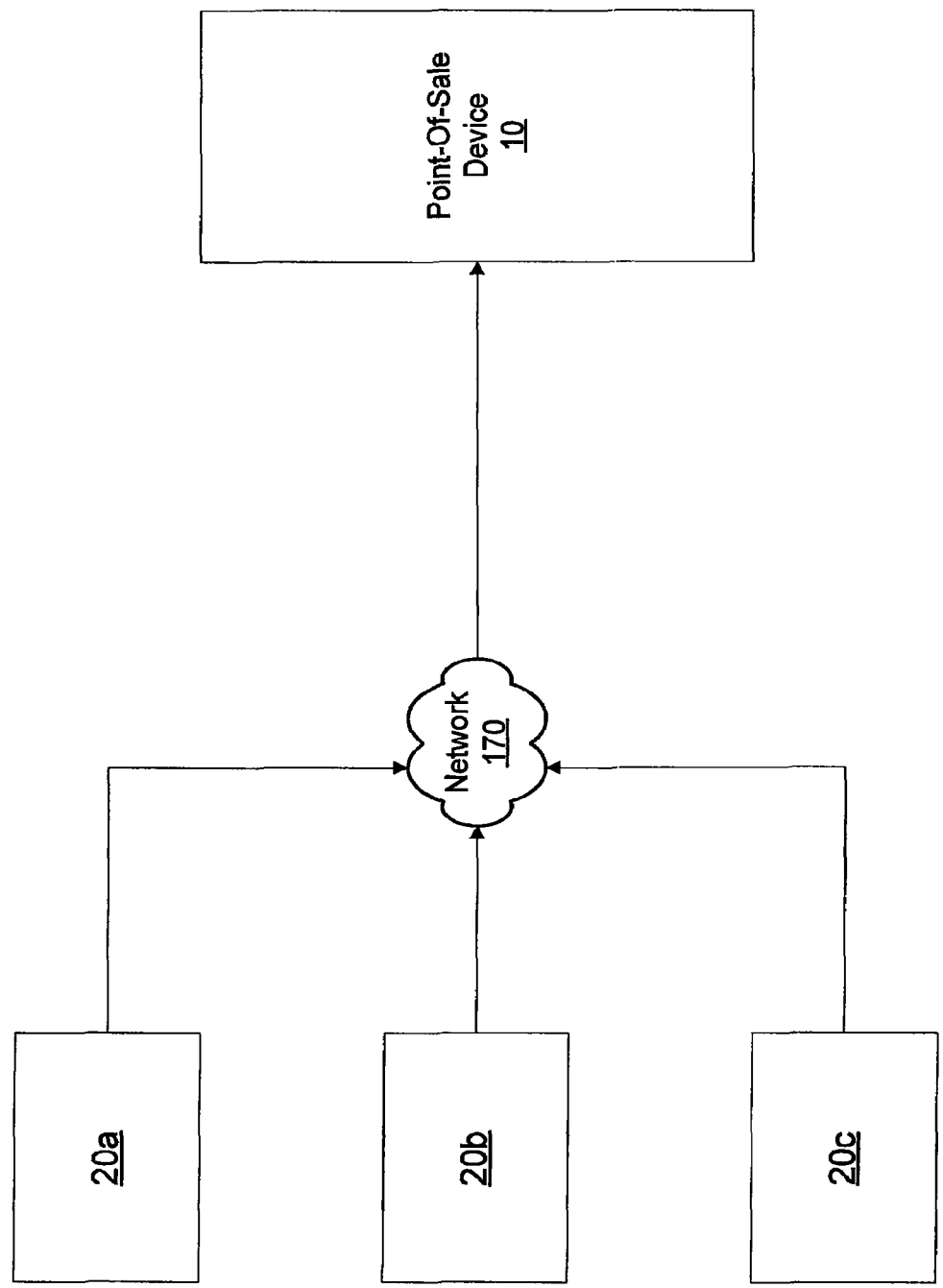
FIG. 1 is a schematic view of a distributed system in accordance with some embodiments.

FIG. 1 is a schematic view of a device 10 (sometimes called a point-of-sale (POS) device, or content distribution device (CDD)) coupled to a network 170, to which, in turn, are coupled content providers 20, according to an embodiment of the invention. As discussed more fully with reference to FIG. 2, the device 10 is operable to receive from the content providers 20 over the network 170 data sets that comprise content files, such as digital audio files, digital video files (sometimes called digital multimedia content files), still images, text, executable software programs or any other content transmittable in a digital format. The device 10 is further operable to dispense the data sets by storing on a memory device, such as rewriteable digital memory storage media, either supplied by a user or dispensed by the device 10, a data set selected by the user. The device 10 stores the data set on the memory device in exchange for a fee from, or in recognition of another transactional arrangement with, the user. The memory device on which the data set is stored is typically configured to be coupled to a device 30 (e.g., a client device) of the user, such as a personal computer, personal digital assistant, cellular telephone or other electronic device operable to present, for example, the video, audio and/or text associated with the dispensed data set.

Specifically, the device 10 is operable to periodically (e.g., nightly) receive for vending one or more data sets from the content providers 20 over the network 170. The device 10 may also send and receive transactional and other financial information via the network 170. The network 170 may include one or more local-area networks, one or more wide-area networks, such as the Internet, or public switched telephone network. Although the embodiment illustrated in FIG. 1 contemplates the device 10 receiving data sets via electronic transmission over, for example, the network 170, the device 10 may alternatively receive the data files via manual loading of data sets from data storage devices maintained by, for example, an administrator of the device 10.

In some embodiments, the content distribution device 10 is implemented as a fully self contained vending machine or as an operator assisted kiosk operation.

Figure 2:
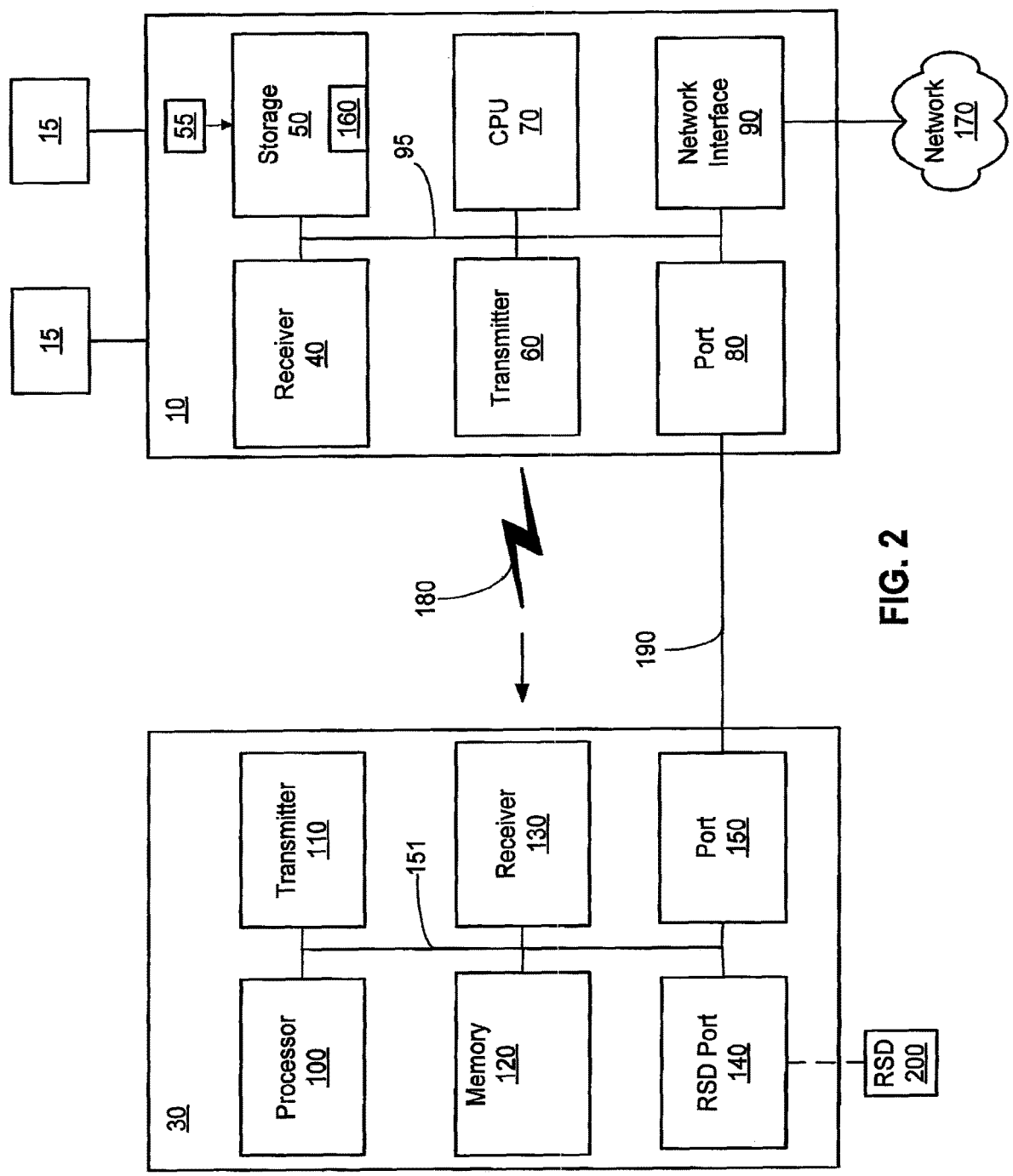
FIG. 2 is a functional block diagram of portions of the system illustrated in FIG. 1 according in accordance with some embodiments.

FIG. 2 illustrates components of and interaction between content distribution device 10 and a client device 30 according to an embodiment of the invention. In some embodiments, device 10 includes a receiver 40, a storage device 50 such as a hard disk drive, a transmitter 60, a central processing unit (CPU) 70, a port 80, and a network interface 90. one more communication buses 95 couples the device components to one another. The communication buses 95 may include circuitry (sometimes called a chipset) that interconnects and controls communications between system components.

In some alternative embodiments, the receiver 40 and/or transmitter 60 may be peripheral devices coupled to the device 10. Device 10 optionally includes a strong physical housing (not shown) with internal power and damage notification elements (not shown) (i.e., Automatic Teller like configurations) to electronically and physically protect content. The storage device 50 optionally includes buffered disks, or other storage media, such as solid-state memory, for permitting high speed loading of content onto drives. The storage device 50 is optionally capable of write rates of, for example, 35 Mbps to over 400 Mbps.

Device 10 optionally further includes or is coupled to one or more interface mediums 15 to allow the device 10 and a user to communicate with each other. As used herein, terms of interaction between the device 10 and a user, such as, for example, "receiving," "selecting," "requesting," and the like, are made with reference to use of one or more of the mediums 15, unless otherwise stated. The interface medium 15 optionally includes a video display, speakers, a cursor device, such as a mouse, and/or a keyboard. The medium 15 optionally further include payment devices that allow the device 10 to receive or otherwise acknowledge payment by the user in exchange for the user receiving the requested data set. Such payment devices may include coin slots, currency accepters, credit-card readers, smart-card readers, and/or radio frequency identification devices.

In some embodiments, device 30 includes one or more processors 100, transmitter 110, memory 120, receiver 130, removable storage device (RSD) port 140, and a port 150. A bus 151 couples the client device components to one another.

In operation, according to some embodiments, a user of the device 30 wishing to receive a data set for presentation on the device 30 may communicate to a selection of the data set to the device 10.

For example, the user may prompt device 10 to execute a software application with which the user may interact via a medium 15. The software application may prompt the user to input information identifying the file. This identifying information may be input to the device 10 by, for example, selecting the data set from a list of data sets generated by the device 10 to the medium 15, or inputting to the medium 15 a title of the data set.

After receiving an identification of the data set requested by the user, the CPU 70 consults a table 160 of available data sets (e.g., digital multimedia content files) that reside in the storage device 50. Alternatively, the CPU 70 accesses, via the network interface 90, a similar table (not shown) of available data sets stored, for example, on a remote server (not shown) associated with the network 170.

Still referring to FIG. 2, the CPU 70 identifies the data set requested by the user. In alternative embodiments, the data set may be stored on the storage device 50 or may be retrieved by the device 10 from a remote server (not shown) associated with the network 170.

In some implementations, device 10 then prompts the user to pay to receive the requested data set. The device 10 prompts the user by, for example, generating to the medium 15 a price list for each requested data set. Alternatively, the device 10 first provides to the user, in a manner described in greater detail below, a "preview" sample portion of the data set to enable the user to evaluate the data set for purchase.

Once the CPU 70 verifies that payment for the data set has been received, the device 10 may then request that the user identify the memory device on which the requested data set shall be stored. Depending on the type and location of the target memory device, the device 10 may store the data set to the target memory device in a variety of ways. For example, in an embodiment, the transmitter 60 transmits the data set via signals 180 to the receiver 130 of device 30. The signals 180 may be infrared signals, radio-frequency signals that conform to a communication protocol such as Bluetooth, or any other wireless signals. This arrangement may thus allow near-proximity wireless connectivity (e.g., Infrared, Wi-Fi, Bluetooth) for content transfer to computing-platform based storage media (e.g., Bluetooth from device 10 to Cell Phone into MMC card storage on phone).

Alternatively, the CPU 70 can employ the port 80 to communicate the instructions over a cable 190 to the port 150 of the client device 30. The ports 80 and 150 may operate according to any plug-and-socket connection standard such as Universal Serial Bus or IEEE 1394, which are known in the art.

Still alternatively, the port 80 of the device 10 may receive a removable storage device 200 (RSD 200) such as a solid-state CompactFlash device. Consequently, the CPU 70 may store the data set on the RSD 200. The user can then disconnect the RSD 200 from the device 10 and connect it to the RSD port 140 of the client device 30 so that the client device can download the data set from the RSD via the RSD port. The port 80 may be configured to accommodate the entire favorite digital camera storage media forms (e.g., Memory stick, MMC card, SD, Compact Flash etc), USB ports, PDA Cell-phone format storage forms, all for writing/write-checking the data set into a memory.

In an embodiment, the port 80 is operable to lock, in a manner known in the art, the RSD 200 into a locked position during the data set download process, during which the user may pursue other activities with assurance that the RSD will not be removed in the user's absence. The user may than disengage the RSD 200 from the port 80 by, for example, a key (not shown) or identification code supplied to the user by the device 10.

Still alternatively, the device 10 may include a supply unit 55 that is operable to store memory devices, such as RSDs. If desired by the user, the device 10 may store a requested data set on a memory device present in the supply unit 55 and subsequently dispense the memory device to the user. As such, a user without a storage medium but wishing to obtain a data set may purchase both the data set and the storage device on which the data set is stored from the device 10.

Still alternatively, the device 10, after identifying the requested data set and the target storage medium indicated by the user, may determine that the target medium has insufficient storage space or is otherwise unsuited to receive the requested data set. In this event, the CPU 70 may consult equipment specifications stored, for example, on the storage 50 or other location in order to identify equipment that the user may employ in order to receive the requested data set. The device 10 may then generate to the medium 15 a list of such equipment that the user may purchase from the device 10 or elsewhere.

In an embodiment, the requested data set (e.g., a digital multimedia content file) is encoded. Accordingly, the device 10, when storing the requested data set on a target storage medium may further store thereon a decoding data set that, when executed, operates to decode the requested data set, thereby enabling presentation of the requested data set. Techniques by which content files and associated decoding data sets may be created and employed by, for example, the device 10 are described in commonly owned U.S. patent application Ser. No. 10/848,224, titled "Multimedia Storage Systems and Methods," and filed May 17, 2004, the entirety of which is hereby incorporated by reference.

Storage 50 may include a plurality of player/decoder program files and may also include a plurality of decryption program files. Each player/decoder program is a different version of the same decoder software and is compatible with a respective different type of electronic system, and/or is compatible with a respective different operating system employable by an electronic system such as the client device 30. Moreover, the decoder, of which each player/decoder program is a different version, corresponds to the scheme used to encode a file (or data set), such as a digital audio file or digital multimedia content file, and is thus required in order to decode the file (or data set). Similarly, each decryption program is a different version of the same decryption software and is compatible with a respective different type of electronic system, and/or is compatible with a respective different operating system employable by an electronic system such as the client device 30. Moreover, the decryption software, of which each decryption program is a different version, corresponds to the scheme used to encrypt the file (or data set), and is thus required in order to decrypt the file (or data set).

Device 30 may be a handheld device. Handheld device operating systems typically contain instructions enabling an inserted or associated memory card to run an autoexecute/autoload program on the device. According to an embodiment of the present invention, memory 120 in device 30 is partially formatted using a file allocation table (FAT) format per the standard for an MMC card. Using this file format, a directory is made and named for a host device such as the device 30. This directory includes at least one autoloading program compatible with the particular type of the client device 30 and may include several programs, each of which may be compatible with a respective different electronic system and/or operating system associated therewith.

The device 10 may otherwise provide digital rights management (DRM) and content protection for all the contained and dispensed content by employing systems already in place for content protection/DRM such as that standardized by Internet Groups and the International Telecommunications Union (ITU). Every data set dispensed will contain its own serial number so that unauthorized use may be traced and prosecuted. The serial number cannot be changed without at the same time erasing as least some of the content of the data set. The data sets (e.g., digital multimedia content files) transmitted to the customer's storage media device may also be constrained to play from that device only. If the attempt is made by the customer to copy the media onto any other storage than that originally dispended onto, the media will not play.

For example, a content anti-copy mechanism may be used when writing content to memory cards, whereby the serial number of the memory device is utilized. This process requires that the serial number of the card be read by the device 10 and then written onto the card as part of the data set, as well as loaded with the data player/decoder on the card.

Should the card data be subsequently copied on to another medium such as a second programmable flash card, the files would not play since the new card would have a different serial number from the original. Thus the card would act as a dongle preventing play of the data by its own self-contained player. Use of video players on a playing device (e.g., cell phone) would not permit this manner of anti-copy protection.

The number of plays that will be allowed for a given price may be accommodated by the device 10, such that, for example, a rental movie can be played but once (or N times) as contrasted against a music video which would normally receive unlimited plays.

This limitation whereby the number of plays may be limited in a pay per view application may be achieved by utilizing rewritable cards such as flash memory cards. Read-only and write once flash cards may not be employed for this method. The device 10 may, when reading a card, be able to determine whether the card is a multi-time programmable card. In the event that the card is programmable, the software associated with the player accompanying the data set will implement a count down on play cycles and write the same to the card upon the completion of each play. When the N-views have been counted for which N was paid, the player will limit the plays to that specified by reading and comparing the counts written on the card. The player may, after this limit has been reached, scramble the original data file.

When writing new content onto the customer's rewriteable disk storage media, the device 10 may automatically recognize and utilize storage areas on the storage device/card which have been previously used for content for which use has now expired. The device 10 will allow a customer to block files from being overwritten with new content by, for example, allowing the customer to specify the memory portions into which content should be written.

Other embodiments of the arrangement shown in FIGS. 1 and 2 are contemplated. For example, the client device 30 and device 10 may respectively include more or fewer than all of the components illustrated in FIG. 2. For example, if the device 10 and client device 30 communicate only via a wireless channel, then the device 10 may omit the port 80.

Figure 3:
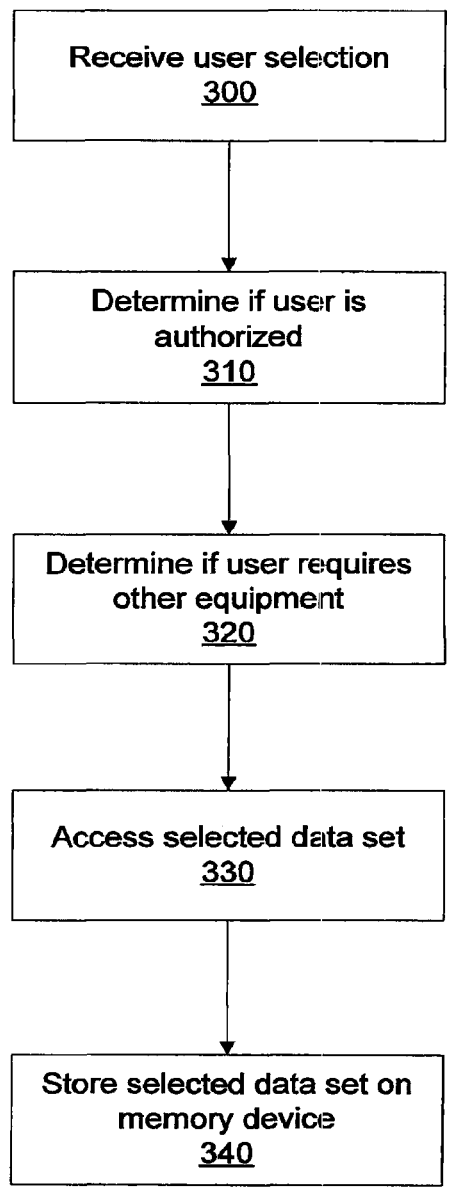
FIG. 3 is a flow diagram of a content distribution method in accordance with some embodiments.

FIG. 3 illustrates a process of providing a data set according to an embodiment of the invention. Beginning at a step 300, a user wishing to receive a data set provides an indication of his/her data set selection to the device 10. After receiving an identification of the data set, at a step 310, the device 10 determines if the user is authorized to receive the data set (i.e., whether the user has paid for the data set). Subsequently, at a step 320, the device 10 determines whether the user has identified an appropriate target memory device or whether the user requires additional or other equipment. At a step 330, the device 10 accesses the requested data set. Subsequently, at a step 340, the device 10 stores the requested data set on the target memory device.

The conflux of several new technologies and trends lend themselves to embodiments of the invention described herein. For example, video and audio compression advances make it possible for near DVD quality movies with high-fidelity sound to be stored in a fraction of the storage earlier required (e.g., a 93 minute near DVD quality, movie can be stored with spare on a 512 MB USB Flash Drive). Thus on the internal storage of the device 10, where, for example, a terabyte (four 250-GB Disk Drives) can easily and inexpensively now be accommodated, thousands of movies, music videos and high quality audio tracks can be accessed.

The device 10 may dispense content encoded in technology other than that employed in DVD movies or on CD players. The decoder contained with a data set is utilized by the general purpose processor of the computing platform to decode and render the video/audio and must be adaptable to operating system and "playing platform" CPU and video configuration. The decoder will not be specified for any particular "standard" and may be anything which renders good quality. The owner or administrator of the device 10 may provide for the encoding of the data and provide DRM/content protection to the satisfaction of the content owner/licensor. Provision may be made for license fees/per dispensation to be collected by the device 10 owner and paid to the content owner.

Inexpensive rewriteable digital memory forms promote implementation of embodiments of the invention described herein. Principally flash memory and its successors, which were pioneered for digital cameras, have now penetrated into the computer memory field and are the storage form of choice for portable applications as evidenced by their embrace by PDA's, cell phones, and now are the desktop/laptop portable storage form of choice. Capacities on the market already are in the 4 GB/device range, enough to accommodate many movies at a time. The I/O data rates of these memories are also already such that a 90 minute movie could be loaded from the device 10 onto a memory within a matter of less than 10 seconds at the nominal rates (400+ Mbps). Not all memory forms may be that rapid, and may require more time to load a 90-minute movie. Locks known in the art that prevent removal of consumer storage devices absent an unlock code or physical security identification means, such as a key, may be provided in connection with the device 10, and allow the consumer to walk around the store, e.g., supermarket, during the content download.

High speed general purpose computing processors with video output capability now exist in all computing platforms, such as desktops, laptops, PDA's and cell phones. Some devices are already on the market for reading memory cards and converting the output for input to a TV set (e.g., Vosonic Digiviewer 3020).

Advanced audio processing now exists to convert a normal stereo signal into high-fidelity sound without adding significant bandwidth to the coded signals. These technologies promise new form for earlier released sound tracks.

Computer program code for carrying out operations of embodiments of the present invention, such as, for example, the described operation of the CPU 70, may be written in an object-oriented programming language, such as JAVA, Smalltalk, or C++. Computer program code for carrying out these operations may also, however, be written in conventional procedural programming languages, such as the C programming language or compiled Basic (CBASIC). Furthermore, some modules or routines may be written in assembly language or even micro-code to enhance performance and/or memory usage. In addition, at least one carrier signal may be modulated with computer program code for carrying out the described operations.

Figure 4A:
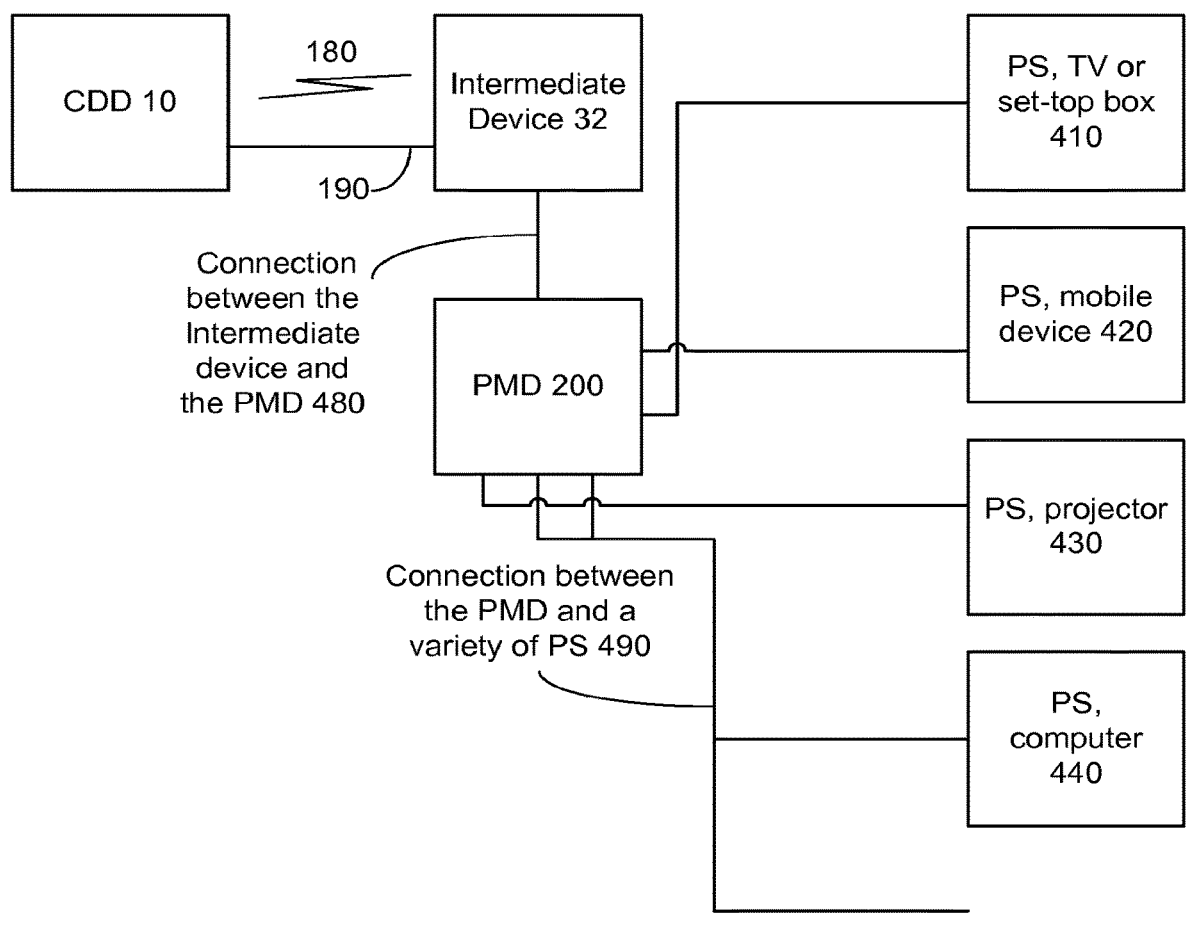
FIG. 4A is a block diagram showing a protected memory device (PMD) receiving content from a content distribution device via an intermediate device, in accordance with some embodiments.
Figure 4B:
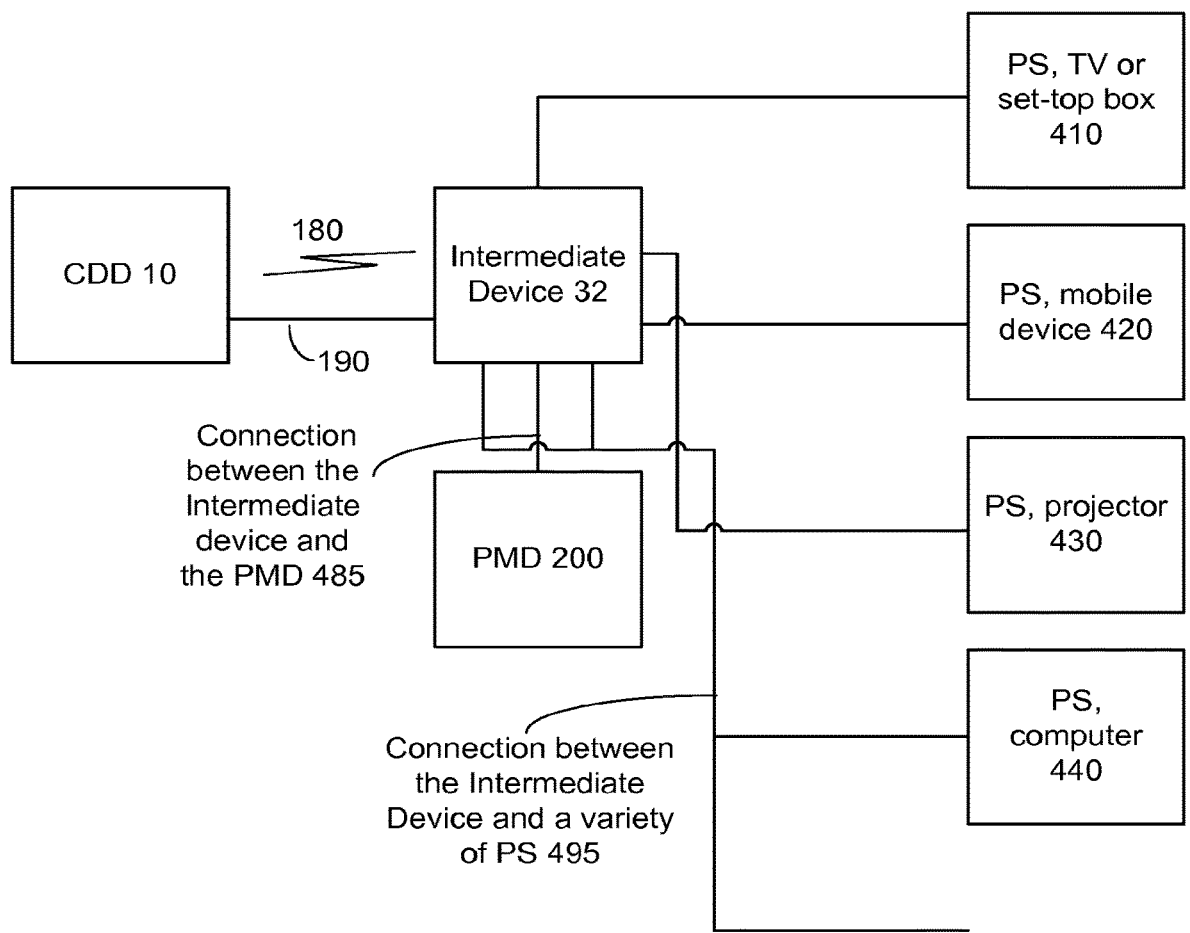
FIG. 4B is another block diagram showing a protected memory device receiving content from a content distribution device via an intermediate device, in accordance with some embodiments.
Figure 6:
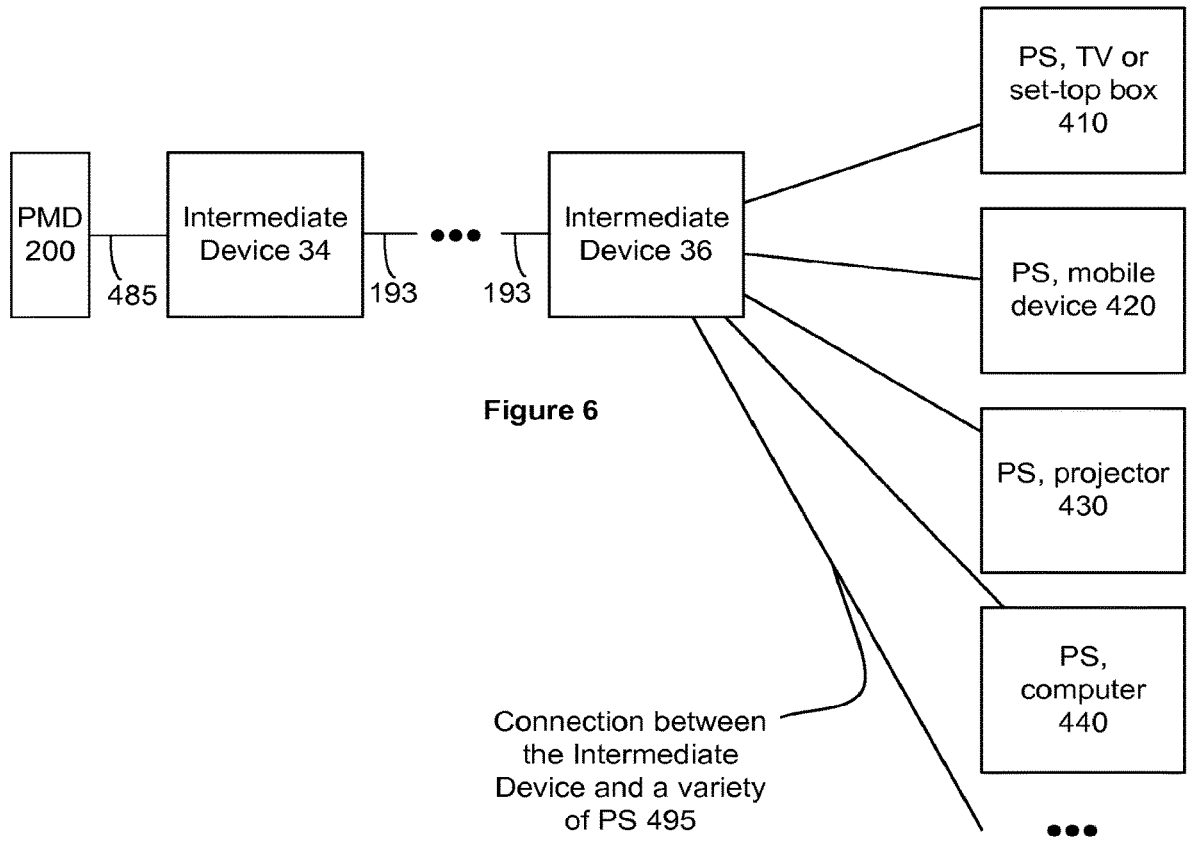
FIG. 6 is a block diagram of a protected memory device connected to one or more presentation system devices via one or more intermediate devices, in accordance with some embodiments.

Referring to FIG. 4A, in some embodiments the content distribution device 10 (CDD 10) connects to an intermediate device 32 that includes, or is coupled to, a removable storage device (RSD), called a protected memory device 200 (PMD 200) in FIGS. 4A-4B and 6. The transactional data and content data exchange functions are performed using the electronic connection 190, CPU, temporary storage, user I/O, and other functions as necessary of intermediate device 32. The PMD 200 is the source for authentication data (e.g. Serial Number, Public Key, cookies) and the repository content data.

The connection 190 between the CDD 10 and the intermediate device 32 can be achieved with a number of different protocols including physical connections 190. Examples of physical connections 190 are USB; interfaces for memory cards such SD, MiniSD interface, CompactFlash, MemoryStick, MMC, SmartMedia, xD; Ethernet, IEEE 1394 (Firewire), Small Computer System Interface (SCSI), Advanced Technology Attachment (ATA), High Definition Multimedia Interface (HDMI), wireless connections (e.g. IEEE 802.11 (WiFi), Ultra Wide Band (UWB), Bluetooth, Wireless Universal Serial Bus (Wireless USB), Worldwide Interoperability for Microwave Access and IEEE 802.16 (WiMax), Wireless Broadband (WiBro), Infrared (IrDAIT), Radio Frequency Identification (RFID), Near Field Communication (NFC), Near Field Magnetic Communication, HiperLan, HiperMan, IEEE 802.20, IEEE 802.15.4 (Zigbee).

While connection 190 connects intermediate device 32 to CDD 10, a connection 480 connects the intermediate device 32 to the PMD 200, facilitating authentication, transactional, and content data exchange between the vendors connected to CDD 10 and the PMD 200. The connection 480 between the intermediate device 32 and the PMD 200 can be achieved with a number of different protocols, including any of the examples of physical connections listed above.

FIG. 4A also shows connections 490 between the PMD 200 and one or more presentation system devices (PSDs) 410, 420, 430, 440, where the data is consumed and/or the content played. Examples of presentation system devices (PSDs) include, but are not limited to, Smart TVs, TVs, set-top boxes 410, mobile devices 420, projectors 430, computers 440, and smart appliances, vehicles equipped with video, audio, geographic and other data systems. In some embodiments, the PMD 200 is disconnected from the intermediate device 32 before it is connected to a respective PSD 410, 420, 430 or 440. Thus, in some embodiments, PMD 200 is not connected to the PSD (e.g., PSD 410) at the same time that the PMD 200 is connected to the CDD 10.

The connection 490 between the PMD 200 and the PSD 410-440 must be fast enough to provide content data in a timely manner (e.g., at a video play rate for multimedia content) and can be achieved with an number of different protocols including any of the examples of physical connection protocols listed above.

FIG. 4B shows another embodiment, where intermediate device 32 is connected 485 with the PMD 200 and is also connected with the player devices 410-440. The content and software programs are sourced from the PMD 200, transferred to the intermediate device 32 via the connection 485 and are played on the players 410-440. In some embodiments, intermediate device 32 is disconnected from the CDD 10 before it is connected to the PSDs 410-440.

The connection 485 between intermediate device 32 and PMD 200 may be achieved via a variety of protocols, like those listed with respect to connection 480. In some implementations, connections 485 and 496 are both fast enough to provide content data to a PSD (via connections 485 and 495) for real time streaming of the content to the PSD as the PSD plays the content. Such real time streaming of content from PMD 200 through intermediate device 32 to PSD 410-440 can be achieved with a number of different protocols, including any of the examples of physical connection protocols listed above.

Figure 5A:
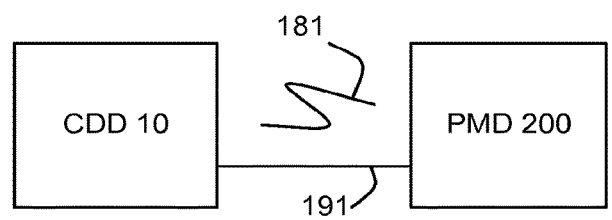
FIG. 5A shows a protected memory device directly connected to a content distribution device, in accordance with some embodiments.

Shown in FIG. 5a, some embodiments have PMD 200 directly connected to CDD 10. The connection between CDD 10 and PMD 200 can be achieved with a number of different protocols, including any of the examples of physical connection protocols listed above.

Figure 5B:
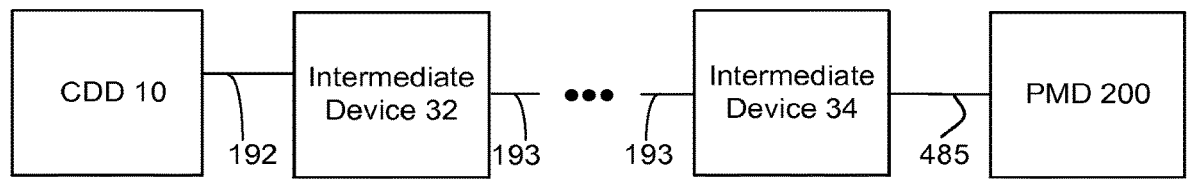
FIG. 5B shows a protected memory device connected to a content distribution device via one or more intermediate devices, in accordance with some embodiments.

Shown in FIG. 5b, in some embodiments the CDD 10 is connected to the PMD 200 via one of more intermediate devices 32-34. The connections between all of these devices 192, 193, 485 can be achieved with a number of different protocols, including any of the examples of physical connection protocols listed above. Note that even in the same embodiment, the connections between individual pairs of devices need not use the same physical connection protocol as the protocol use in the connections between other pairs of the devices.

Shown in FIG. 6, in some embodiments the PMD 200 is connected to the PSDs 410-440 via one of more Intermediate Devices 34, 36. The connections 485, 193, 495 between these devices can be achieved with a number of different protocols, including any of the examples of physical connection protocols listed above. Note that even in the same embodiment, the connections between individual pairs of devices need not use the same physical connection protocol as the protocol use in the connections between other pairs of the devices.

Figure 7:
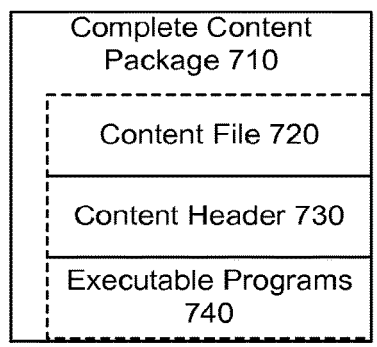
FIG. 7 is a block diagram of a content file or package, in accordance with some embodiments.

In some embodiments, to access the content provided to a PSD, several components are needed by the PSD. FIG. 7 shows an embodiment having three elements in a Complete Content Package 710. First is the content file 720, which contains the content to be played and is encrypted for copy, tracking, and DRM protection. Second is the content header 730, which contains information necessary to authenticate the PMD and decrypt the content file. Third is a set of executable programs 740 that perform authentication, DRM tracking, decryption, decoding, and display of the content. Typically, the PMD 200 and/or content delivery device 10 store several versions of these programs, each designed to run on different OS (e.g. Windows, Mac OS, Linux, Android) and PSDs. In some implementations, a version compatible with the PSD is included in the complete content package 710 delivered to the PSD.

In the embodiments described above, the entire Complete Content Package 710 is delivered to the PMD 200 from the CDD 10. In other embodiments, the Complete Content Package is transferred from a CDD to an intermediate device 32 (which might also serve as a PSD) without the PMD present. The Complete Content Package is temporarily stored on intermediate device 32 or is transferred to other intermediate devices and/or PSDs.

In most embodiments, at least the decryption process, for decrypting the content file 720, requires authentication that can only be provided with data and/or functionality available from the PMD 200. Thus, the system that is executing the programs must have access to the PMD, at least once and in some implementations multiple times, at runtime. In most embodiments, the three elements of the complete content package 710, described above, and the PMD 200 must be accessible to the system (e.g., any of the systems shown in FIGS. 4A, 4B, 5A, 5B and 6) at runtime.

In other embodiments, the Complete Content Package 710 is delivered in parts (all or part of the Content File 720, all or part of the Content Header 730, and/or all or part of the Executable Programs 740) to the PMD or Intermediate Device, or directly to the PSD, in multiple transactions and downloads. In some implementations, how the package is delivered depends on the existing state of the involved devices. For example, the PSD may already have the appropriate executable programs, in which case those need not be downloaded. In another example, the content file may be downloaded directly to the PSD (or via an intermediate device). However, the PSD cannot display the content in content file 720 until the corresponding content header 730 has been downloaded to the PSD and an authenticated PMD is connected to the PSD.

In some embodiments, portions of a respective Content File 720 that correspond to the capabilities of the PSD are delivered to the PSD. In one example, when the Content File is a movie compressed in the MPEG-4AVC SVG format, the first part of the content file 720 is a reduced resolution corresponding to a small screen found on a smart phone. The next part of the content file 720 is the part used to create a higher resolution image for a large screen, e.g., in a home entertainment system. Several different types of progression and progressive formats can be handled in the same way.

In some implementations, to consume the content, several functions are executed on the content file 720. These functions are performed by the executable programs 740 contained in the Complete Content Package 710. For example, a common set of functions include authentication of the content and the PMD, decryption and DRM processing, and content decoding and processing. Each of these functions can be performed in one of several places including the PSD, the Intermediate Device, and, the PMD itself, if the capabilities exist in the PMD.

Figure 8:
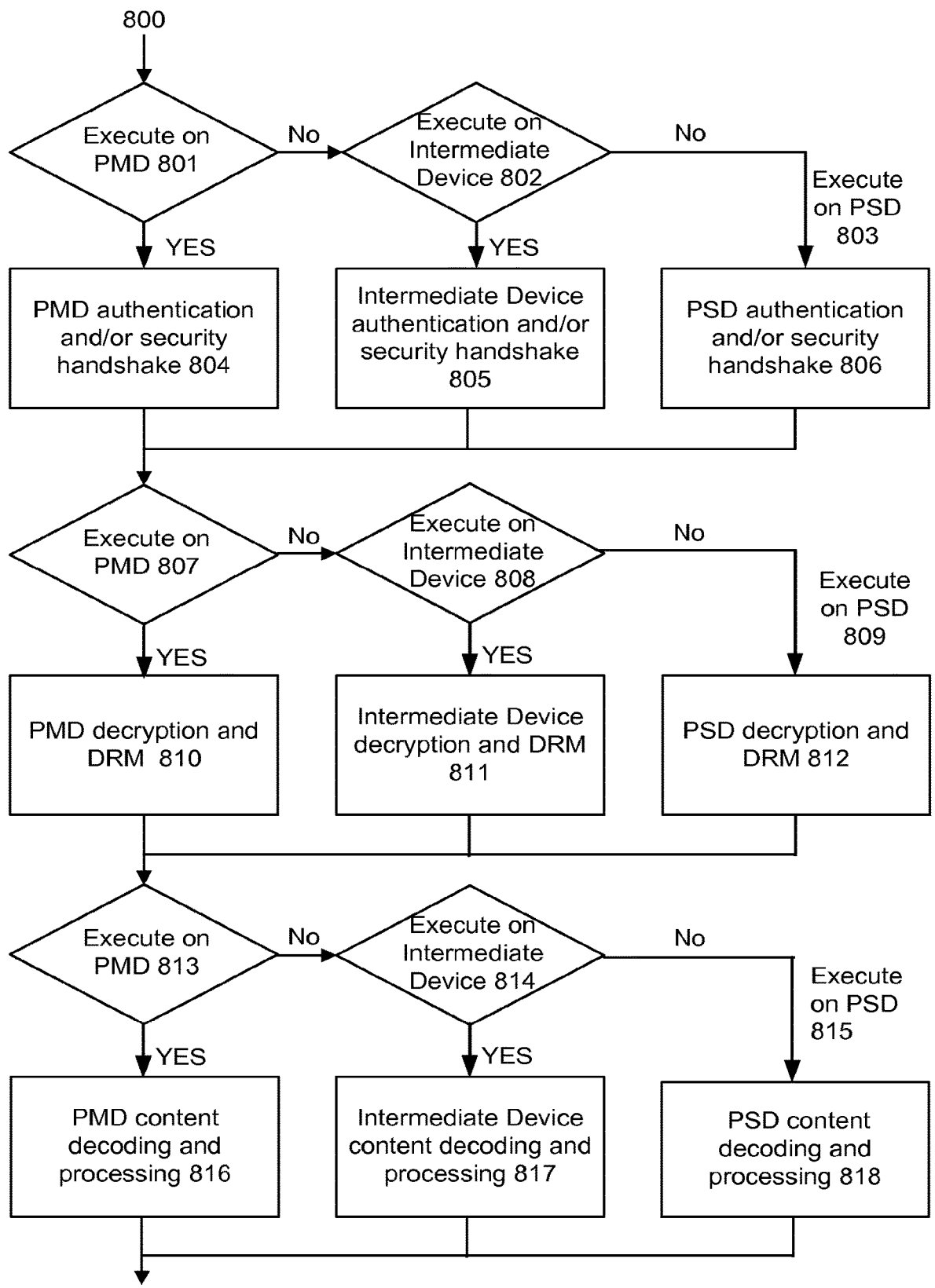
FIG. 8 depicts a flow diagram associated with execution of instructions in a software stack and distribution of execution between devices, in accordance with some embodiments.

FIG. 8 shows an example flow chart in accordance with some embodiments. Starting at 800, a first decision 801 is whether to execute authentication on the PMD. If the capabilities exist (e.g., CPU) and the logic of the content header suggests it, the decision is Yes and the authentication is performed on the PMD 804. If No, the next decision is whether the authentication is performed on one of the Intermediate Devices. Once again, depending on the resources and the content header logic, if the decision is Yes the authentication is performed on the Intermediate Device 805. If No, the authentication is performed on the PSD 805.

Likewise, if the PMD is capable and indicated in the logic of the content header 807, the PMD executes the decryption and DRM functions 810. Else, if one of the Intermediate Devices is capable and indicated in the logic of the content header 808, an Intermediate Device executes the decryption and DRM functions 811. Else, the PSD executes the decryption and DRM functions 812.

Likewise, if the PMD is capable of executing the content decoding and processing functions, and execution of those functions by the PMD is indicated, directly or indirectly, by the content header 813, the PMD executes the content decoding and processing functions 816. Else, if one of the intermediate devices 30 is capable of executing the content decoding and processing functions, and execution of those functions by the intermediate device 32 is indicated, directly or indirectly, by the content header 814, an intermediate device 32 executes the content decoding and processing functions 817. Else, the PSD executes the content decoding and processing functions 818.

Although FIG. 8 shows a flow chart, in some implementations the actual decision about where to execute the decryption and DRM functions, and the decoding and processing (e.g., playback) functions, depends on a decision matrix that includes the factors concerning one or more of: interaction between the programs, data flow, security, and other practical factors. Furthermore, other sets of data path functions are possible and treated similarly.

In some embodiments, the secure, trackable transactions described above interact with a PMD that is rarely or never physically removed from the intermediate device 32. For example, the PMD might be a cell phone smart chip that is placed in the phone at the factory or store and never removed thereafter.

In some embodiments, the PMD is not actually a removable card, but the functional equivalent is included in the hardware mother board of the device. The memory and capabilities of this type of system differ, however, from the system memory in a device. In some embodiments, features such as serial number authentication, connected and disconnected DRM, multiple players for different devices, content, and OS, transactional tracking and confirmation, the ability to play on different devices, and other features are preserved regardless of the physical implementation of the PMD.

Figure 9:
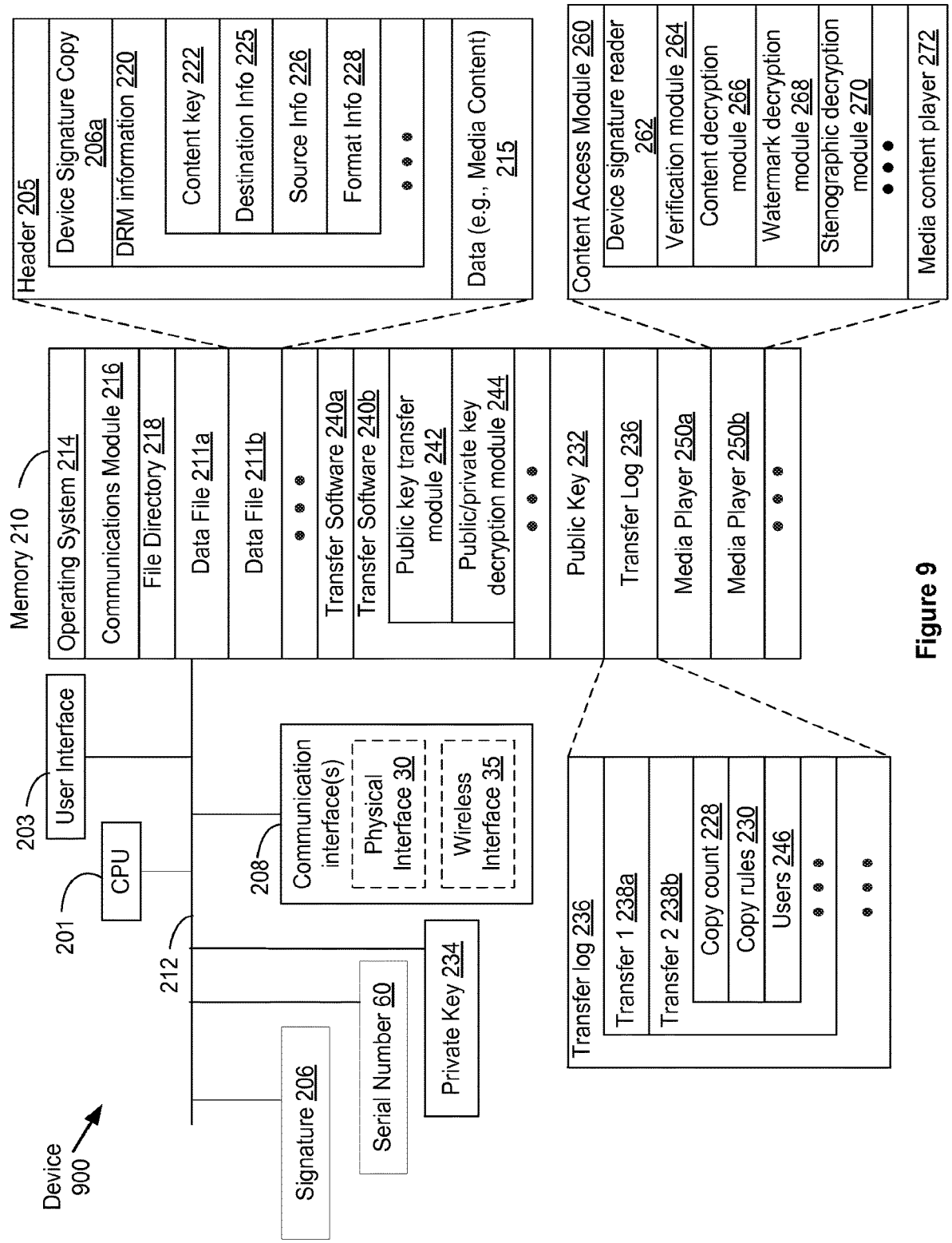
FIG. 9 shows a block diagram of a protected memory device, in accordance with some embodiments.

FIG. 9 is a block diagram illustrating a system 900, used in various embodiments to implement CDD 10, PMD 200, and/or any of intermediate devices 32, 34, 36 in combination with a PMD 200. In some embodiments the PMD devices have a form factor that enables these devices to be hand held and easily transportable. Examples of PMD devices are USB flash memory devices (sometimes in the form of a memory card, memory stick or the like) laptop computer, tablet computer, phone, and personal digital assistant (PDA). In some embodiments, source device 101 is a device having non-volatile semiconductor memory storing one or more content files and having a size no greater than 8 cm by 2.5 cm by 1 cm. Similarly, in some embodiments target device 102 comprises a device having non-volatile semiconductor memory storing one or more content files and having a size no greater than 8 cm by 2.5 cm by 1 cm. Typically, PMDs 200 have one or more processors in the memory controller, and programs that are executed by the one or more processors. Thus, some or all of the processing operations needed (e.g., encryption, decryption, key management, watermarking, stenography, hashing, metadata logging, and even content encoding and decoding) for transferring protected content between a PMD and another device can be performed by the PMD.

System 900 includes one or more processors (CPU's) 201 for executing modules, programs and/or instructions stored in memory 210, and one or more communication buses 212 for interconnecting these components. Execution of modules, programs and/or instructions by the one of more processors 201 enables performance of the operations described below (e.g., encryption, decryption, key management, metadata logging, content encoding and decoding, etc.). System 900 optionally includes (but typically does not include) a user interface 203 having a display device and a keyboard (not shown). It should be noted that system 900 does not necessarily need a user interface 203 or even the computational ability to render the content that it holds. For example, in some embodiments, system 900 does not play or display the content, and instead merely acts as a repository of the content. The communication buses 212 may include circuitry (sometimes called a chipset) that interconnects and controls communications between system components. System 900 also durably stores a manufacturer assigned serial number 207 and/or a device signature 206, and typically at least one of serial number 207 and device signature 206 is stored in a secure location (e.g., a register) of system 900. Device signature 206 is used for authenticating system 900 and for securely storing content. Optionally, serial number 207 is directly or indirectly used as signature 206, and thus in some embodiments system 900 durably stores only one of serial number 207 and signature 206. Alternatively, system 900 durably stores a manufacturer assigned serial number 207 that is separate from device signature 206. In some implementations, serial number 207 is the media access control address (MAC address) of system 900. system 900 also includes one or more network or other communications interfaces 210 such as a physical interface 30 and/or a wireless interface 35.

Memory 210 includes non-volatile memory, such as one or more magnetic disk storage devices, optical disk storage devices, flash memory devices, or other non-volatile solid state storage devices and may also include high-speed random access memory, such as DRAM, SRAM, DDR RAM or other random access solid state memory. Memory 210, or alternately the non-volatile memory device(s) within memory 312, comprises a non-transitory computer readable storage medium. In some embodiments, memory 210 or the computer readable storage medium of memory 210 stores the programs, modules and data structures described below, or a subset thereof:

an operating system 214 that includes procedures for handling various basic system services and for performing hardware dependent tasks. In some embodiments, however, system 900 does not include an operating system 214.

a communications module 216 that includes one or more procedures for managing communications between system 900 and another device or system (e.g., an intermediate device 32 or PSD 410-440 via the communications interface(s) 208 (physical or wireless).

a file directory 218, which includes entries for the content files 211*a-n* stored on memory 210.

one or more content files 211*a-n*, such as one or more multimedia content files (e.g., audio files, video files, and/or audio-video files). Content files 211 may include files other than multimedia content files, such as image files, text files, spreadsheets, databases, etc. Prior to being loaded into memory 210, content files 211*a-n* may be encoded and/or encrypted according to an appropriate scheme or schemes. For ease of discussion, the following description will assume that both encryption and encoding are applied to a given content file 211, although embodiments of the present invention contemplate application of only one of encoding or encryption, as appropriate.

A respective content file 211 includes content 215 (such as, audio content, video content, audio-video content, etc.) and header 205. More generally, a respective content file 211 (also herein called a data file) includes content (e.g., information or data of any suitable type) 215 in addition to the header 205. In some embodiments, a device signature copy 206*a* or information corresponding to a respective device signature is included in header 205 of content file 211. When data/content 215 is to be played, decoded or otherwise accessed, the device signature copy 206*a* or corresponding information in header 205 is compared with the device signature 206 of the system 900 in which respective content file 211 is stored, and access is denied when the two do not match. This prevents unauthorized copies of content file 211 from being played, decoded or otherwise accessed. In the embodiments described here, if content file 211 is an authorized copy of the file, the device signature copy 260*a* or the information corresponding to device signature copy 206*a* in header 205 matches (or, more generally, is consistent with) the device signature 206 of the particular device 101/102 on which the content file 211 is stored.

Optionally, instead of (or in addition to) header 205 including a device signature copy 206*a* or information corresponding to a respective device signature, header 205 may be encrypted using a key comprising the device signature or information corresponding to the device signature. In this way, only a device having access to the device signature can decrypt header 205 and thereby gain access to content key 222, which is required for accessing (e.g., decrypting and/or decoding) content 215 in content file 211. Alternatively, header 205 may be encrypted using an encryption key that is independent of the device signature. As discussed in more detail below, content key 222 is optionally, and typically, a symmetric key, used for both encrypting and decrypting the data 215 in the data file 211.

Header 205 may include other metadata, such as Digital Rights Management (DRM) information 220. In some embodiments, DRM information 220 includes values, rules or other information for restricting content transfer. For example, the DRM information 220 may include copy rules 230 that limit the number of times content 215 can be transferred, e.g., a number in the range 0 to N, where N is a positive integer. This limit is enforced by procedures and/or logic that utilize DRM information 220; in some implementations, the copy limit is propagated to the target PMD, decremented after every transfer and stored as a copy count 228. It should be noted that while DRM is sometimes used to manage copyrighted materials, other uses of DRM are anticipated in this application. For example, the data files being transferred could contain non-copyrighted material that is of a sensitive or personal nature. For example, the data files could be medical files.

In some embodiments, DRM information 220 requires a signature handshake, login, or metadata transfer with a web service application (203, FIG. 1) that tracks content transfers. In other embodiments, DRM information 220 requires an exchange with the web service application 203 to get permission for the transfer. This web service interaction might also entail a transaction. For example, the user could buy permission to copy the content to the target device 102.

In some embodiments, DRM information 220 restricts the type of target devices to which the content can be transferred. For example, only PMDs may be allowed for target devices 102. In some embodiments, certain devices may be allowed only a "read only" copy of the information, while other devices are allowed "read/write" access. Optionally, the DRM requires a signature handshake, login, or metadata transfer with the web service application that tracks content transfers. In some embodiments, DRM information 220 (e.g., copy count 228 and/or copy rules 230) dictate the disabling or removal of the content file 211 (or content 215 of content file 211) from the source PMD after transfer of the content to a target PMD. It should be noted, that because content 215 is only accessible by means of content header 205, content 215 can be disabled by the removal or alteration of content file header 205 or by complete removal of content file 211 itself from the source PMD.

Digital Rights Management (DRM) information 220 optionally includes one or more of: destination information 224 (e.g., information identifying the destination device, PSD, to which the data file 211 was or is being delivered), source information 226 (e.g., information about the device from which the data file 211 was or is provided, and format information 228 (e.g., information about the format of data/content 215.

In some embodiments, the content file 211 comprises multimedia content 215 that has been encrypted using content key 222. The content key 222 is typically, but not necessarily, a random symmetric key that is not specific to the device 900. In some embodiments, each content file 211 has its own content key, while in other embodiments, all of the content on a particular device 200 or library is encrypted with the same content key.

Memory 210 stores one or more data transfer programs or modules (transfer software) 240*a-n*. Optionally, a respective data transfer program or module 240 includes a public key transfer module 242 and a public/private key decryption module 244. In some embodiments, the transfer computations take place on the PMD 900, the computations being performed by the one or more processors 201 using transfer software 240. However, in other embodiments, the PMD does not contain a processor 210, or the processor 210 is not powerful enough to perform the computations required by transfer software 240, or an adequate host is present, and so the computations are performed at host electronic system 103 using transfer software 240 provided by the PMD. Alternatively, in some circumstances, even when the PMD is capable of performing the computations, the computations are still be performed at host electronic system 103. In these embodiments, the transfer software modules 240*a-n* include a plurality of software modules that are compatible with a variety of different types of host electronic systems to which the removable non-volatile memory storage device 101/102 may be coupled, and/or are compatible with respective different operating systems employable by host electronic system 103. In one example, transfer program 240*a* is compatible with a host electronic system that runs a MacOS® operating system, transfer program 240b is compatible with a host electronic system that runs a Windows® operating system, transfer program 240c is compatible with a host that runs an Android operating system, transfer program 240d is compatible with a host that runs a Windows CE operating system, transfer program 240e is compatible with a host that runs a Palm operating system, transfer program 240f is compatible with a host that runs a Unix based operating system, and so on. Optionally, transfer programs 240a-n include one or more programs written in one or more interpreted languages, such as Java, Python, Ruby, and Flash, which run on many operating systems. Accordingly, in some embodiments, memory 210 stores transfer software modules 240a-n that are compatible with a plurality of different commercially available host electronic systems, enabling the removable non-volatile memory storage device 101/102 to be used with a variety of devices.

In some embodiments, memory 210 of a respective PMD 900 also stores public key 232, which is unique to PMD 900. The corresponding private key 234 is stored elsewhere in the device, in a more secure and less accessible location than public key 232. For example, it may be stored in a register from which it can be used but not exported. In these embodiments, the public and private keys are used to transfer multimedia content files 200 safely, even while using an un-trusted host electronic system 103, as discussed with respect to FIGS. 3A-3B and 4A-4B.

Optionally, memory 210 also stores a transfer log 236. The transfer log 236 stores information about respective file transfers 238a-n. The information stored for each file transfer may include one or more of a copy count 228, DRM copy count rules 230, and information regarding the user(s) 246 involved in the transfer, as well as other pertinent data.

In some embodiments, memory 210 also stores one or more multimedia players 250a-n. Multimedia players 250a-n include a plurality of players that are compatible with different types of host electronic systems with which the removable non-volatile memory storage device 101/102 may be coupled, and/or are compatible with respective different operating systems employable by a host electronic system 103. In one example, multimedia player 250a is compatible with a host electronic system that runs a MacOS® (trademark of Apple Inc.) operating system, multimedia player 250b is compatible with a host electronic system that runs a Windows® (trademark of Microsoft) operating system, multimedia player 250c is compatible with a host that runs an Android (trademark of Google Inc.) operating system, multimedia player 250d is compatible with a host that runs a Windows CE operating system, multimedia player 250e is compatible with a host that runs a Palm operating system, multimedia player 250f is compatible with a host that runs a Unix based operating system, and so on. Optionally, players 250a-n include one or more players written in one or more interpreted languages, such as Java, Python, Ruby, and Flash, which run on many operating systems. Accordingly, in some embodiments, the device includes multiple multimedia players 250 compatible with a plurality of different commercially available host electronic systems, enabling removable non-volatile memory storage device 101/102 to be used with a variety of devices equipped to present visual and/or auditory information.

In some embodiments, upon coupling of the PMD 900 with a host electronic system 103, one of multimedia players 250a-n and/or transfer software 240 is automatically executed by host electronic system 103. For example, this may happen due to the automatic execution of an autoexec or autoload program (not shown) stored in memory 210 of removable non-volatile memory storage device 101/102. Execution of multimedia player 250 includes execution of content access module 260 by the host electronic system 103. Content access module 260 includes a device signature reader 262 for accessing device signature 206 of PMD 900. In some embodiments, device signature reader 262 executes a predefined sequence of file access commands so as to access a file (or other set of data) stored on PMD 900.

Optionally, a respective multimedia player 250 also includes one or more of: verification module 264 for verifying that content file 211 is an authorized copy, decryption module 266 for decrypting multimedia content, watermark decryption module 268 for decrypting a watermark in a file's content, stenographic decryption module 270 for decrypting stenographic information in a file's content, and content player 272 for rendering the multimedia content of the content file. For example, when the content file contains a movie, content player 272 may play the movie on a host device for viewing (and listening) by one or more users of the host device; when the content file contains an audio track or other audio program, content player 272 may play audio track or program on the host device. In some embodiments, each of the multimedia players 250a-n includes a respective different version of an content access module 260 (e.g., multimedia player 250a includes a different version of content access module 260 than multimedia player 250b). Similarly, in some embodiments, each of multimedia players 250a-n includes a respective different version of content player 272 (e.g., multimedia player 250a includes a different version of content player 272 than multimedia player 250b).

Each of the above identified elements may be stored in one or more of the previously mentioned memory devices, and corresponds to a set of instructions. The programs or modules, when executed by the one or more processors of device 101/102, or one or more processors of host electronic system 103, perform the functions or operations described elsewhere in this document. The above identified modules or programs (i.e., sets of instructions) need not be implemented as separate software programs, procedures or modules, and thus various subsets of these modules may be combined or otherwise rearranged in various embodiments. The above identified modules may be implemented using software, hardware, firmware, state machines, or combinations thereof. In some embodiments, memory 210 may store a subset of the modules and data structures identified above. Furthermore, memory 210 may store additional modules and data structures not described above.

Although FIG. 2 is intended more as functional description of various features than as a structural schematic of the embodiments described herein. In practice, and as recognized by those of ordinary skill in the art, some items shown separately could be combined and some items could be separated.

In some embodiments, PMD 900 is integrated with device, such as a mobile device like an Apple Company iPad or iPhone.

In some embodiments, the CDD is a portable device. In some embodiments, the CDD is a dedicated portable device, while in other embodiments, the CDD is implemented in a multi-purpose portable device such as a laptop computer, mobile phone, or tablet computer. In some embodiments, the software and hardware for the CDD (either portable or otherwise) includes a PMD that stores one or more pieces of content.

In some implementations, CDD is incorporated with other existing devices. For example, the CDD is contained within an existing cash register at a store, a bank automated teller machine, the transactional system of a gasoline pump at a gas station, a ticket vending machine, or other vending machine.

In some implementations, the PMD contains specific information, such as cookies and passwords, that enable it, either directly or via an Intermediate Device, to automatically login to specific websites and web services. In some implementations, these websites and web services have pre-arranged transactional relationships (e.g., credit card numbers, account numbers) with the specific PMD or a set of PMDs owned by the same account owner.

Additionally, a higher level of security can be achieved by a secure handshake and authentication of the PMD card. In some implementations, this includes an exchange of a code or serial number encrypted with a private key. The exchange can be initiated by either the PMD or the CDD.

Figure 10:
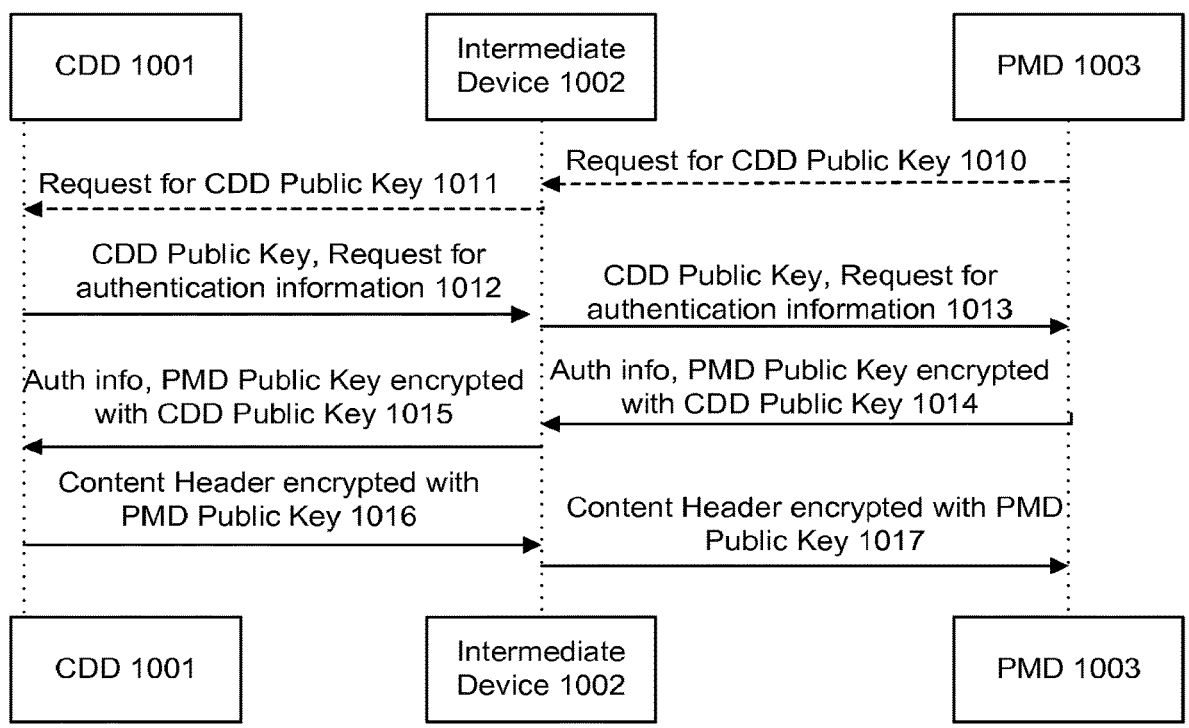
FIG. 10 shows a request and response diagram for a secure handshake between a content distribution device and a protected memory device, in accordance with some embodiments.

FIG. 10 shows a request and response diagram, for communications between a CDD and PMD, in accordance with some embodiments. Note that the Intermediate Device(s) 1002 is shown as passing on the requests and responses. However, in some embodiments, the Intermediate Device(s) 1002 also perform a translation function, and optionally a DRM encryption/decryption function. The PMD 1003 optionally starts the interaction by requesting the CDD's Public Key 1010, 1011. The CDD 1001 sends the CDD's Public Key along with a request for authentication information 1012, 1013 (e.g., Serial Number or Signature of the PMD). The PMD 1003 responds with authentication information and the PMD's Public Key all encrypted using the CDD's Pubic Key 1014, 1015. At that point, the CDD sends at least the Content Header encrypted with the PMD's Public Key 1016, 1017.

In some embodiments, a user interface (UI) is provided (display, keyboard, and/or pointing and selection device) that enables the user to control the interaction between CDD to the PMD or the Intermediate Device. In some embodiments the UI is implemented on the CDD. In some embodiments the UI is implemented on the Intermediate Device. And in some embodiments, when the capabilities exist, the UI is implemented on the PMD itself. The interaction control includes, but is not limited to, warnings about a lack of memory for the content to be downloaded and directing the download to the Intermediate Device or the PMD.

Figure 11A:
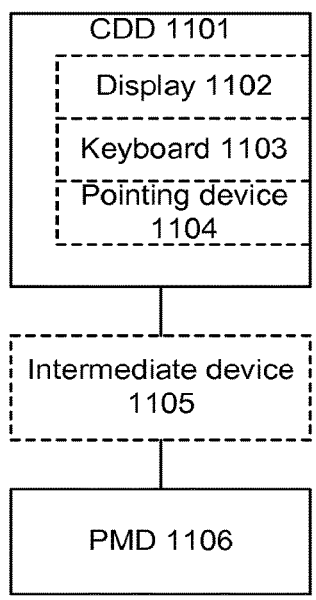
FIGS. 11A, 11B, and 11C show three embodiments of a physical user interface.
Figure 11B:
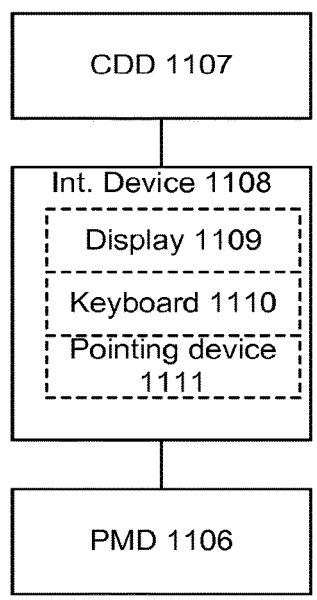
Figure 11C:
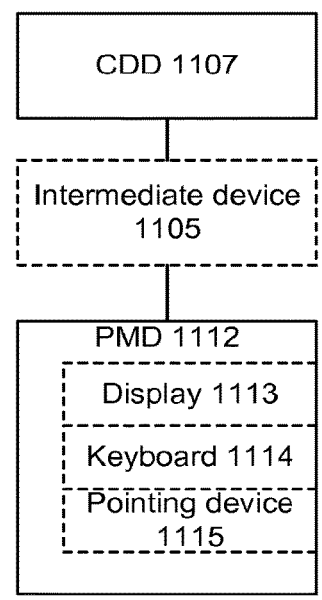

FIGS. 11A, 11B, and 11C show physical embodiments of the User Interface. In FIG. 11A, the CDD 1101 has the physical user interface that includes a display device 1102, a keyboard or other entry system 1103, and optionally a pointing device such as a mouse or trackpad 1104. In FIG. 11B, the Intermediate Device 1108 has a physical user interface that includes a display 1109, keyboard 1110, and/or a pointing device 1111. In FIG. 11C, the PMD 1112 itself has a physical user interface that includes a display 1113, keyboard 1114, and/or a pointing device 1115. In some embodiments, the software that generates and controls the physical interface is executed on the device that contains the physical interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A content dispensing device, comprising:
a memory storing one or more executable programs, each of the programs is compatible with a respective operating system of a multiplicity of distinct operating systems, each of the executable programs for enabling performance of a content associated with a data set on a respective presentation system;
the memory storing a plurality of data sets, each data set configured for presentation by a respective presentation system, wherein each data set includes at least one attribute securely linking the data set to an executable program of the one or more executable programs;
at least one interface configured to transfer information to a protected memory device, the protected memory device configured to directly couple to the content dispensing device; and
wherein the information transferred to the protected memory device includes (A) at least one portion of a data set of the plurality of data sets, and (B) an executable program of the one or more executable programs that is compatible with the operating system of the presentation system that includes one or more player program files for enabling performance of data in the at least one portion of the data set using a processor, wherein each data set is stored as a content package comprising an encrypted content file comprising the content, a header comprising a device manufacturer number copy and Digital Rights Management (DRM) data to authenticate the protected memory device and decrypt the content file, and the executable program including a player program to authenticate, decrypt and display the content using the device manufacturer number copy and the DRM data contained in the header, wherein the player program is configured to compare the device manufacturer number copy in the header with a device manufacturer number of the protected memory device in which the encrypted content file is stored and wherein the player program is configured to play the content when the device manufacturer number copy in the header matches with the device manufacturer number of the protected memory device in which the encrypted content file is stored.

2. The content dispensing system of claim 1, wherein an authentication or handshake function cannot be successfully performed without the protected memory device being logically or physically coupled to the presentation system.

3. The content dispensing system of claim 2, wherein the authentication or handshake function is based on the device manufacturer number of the protected memory device.

4. The content dispensing system of claim 2, wherein the at least one portion of the data set of the plurality of data sets is stored on the protected memory device.

5. The content dispensing system of claim 2, wherein the protected memory device stores both the executable program and the at least one portion of the data set.

6. The content dispensing system of claim 1, wherein the protected memory device is a removable flash storage device.

7. The content dispensing system of claim 1, wherein the at least one attribute is embedded at a location selected from the group consisting of content header of the data set, authentication information of the data set, encryption information of the data set, decryption information of the data set, in the executable program, a data header of the data set and information of the protected memory device.

8. The content dispensing system of claim 7, wherein the content dispensing system includes an encryption system that changes keys dynamically.

9. The content dispensing system of claim 7, wherein authentication, decryption, decoding and display of the data set are performed by a single executable program.

10. The content dispensing system of claim 7, wherein authentication, decryption, decoding and display of the data set are performed by multiple executable programs.

11. The content dispensing system of claim 7, wherein authentication or decryption information is included in the executable program.

12. The content dispensing system of claim 1, wherein the content dispensing system is an existing point-of-sale or kiosk device.

13. The content dispensing system of claim 12, wherein the point-of-sale or kiosk device executes an automatic user login sequence.

14. The content dispensing system of claim 12, wherein the content dispensing device is incorporated into an existing point-of-sale device.

15. The content dispensing system of claim 1, wherein the content dispensing device is portable.

16. The content dispensing system of claim 1, wherein the respective presentation system is configured to display content of the at least one portion of the data set.

17. The content dispensing system of claim 16, wherein the respective presentation system is configured to execute the executable program.

18. The content dispensing system of claim 16, wherein the respective presentation system is configured to directly couple to the protected memory device.

19. The content dispensing system of claim 16, wherein an intermediate device is configured to execute the executable program and wherein the intermediate device is coupled to the respective presentation system.

20. The content dispensing system of claim 16, wherein the respective presentation system is selected from the group consisting of a television, a smart television, a set-top box, a mobile device, a projector and a computer.

* * * * *